United States Patent
Li

(10) Patent No.: US 10,951,055 B2
(45) Date of Patent: Mar. 16, 2021

(54) ENERGY-SAVING HUB

(71) Applicant: Simpower Technology Inc., Taipei (TW)

(72) Inventor: Dong-Sheng Li, Taipei (TW)

(73) Assignee: Simpower Technology Inc., Taipei (TW)

( * ) Notice: Subject to any disclaimer, the term of this patent is extended or adjusted under 35 U.S.C. 154(b) by 127 days.

(21) Appl. No.: 16/264,740

(22) Filed: Feb. 1, 2019

(65) Prior Publication Data
US 2019/0245376 A1     Aug. 8, 2019

Related U.S. Application Data

(60) Provisional application No. 62/626,165, filed on Feb. 5, 2018.

(51) Int. Cl.
| | |
|---|---|
| H02J 9/00 | (2006.01) |
| G06F 13/42 | (2006.01) |
| G06F 1/3296 | (2019.01) |
| G06F 1/3234 | (2019.01) |
| G06F 1/26 | (2006.01) |
| G06F 1/3287 | (2019.01) |
| G06F 13/40 | (2006.01) |

(52) U.S. Cl.
CPC .............. H02J 9/005 (2013.01); G06F 1/263 (2013.01); G06F 1/266 (2013.01); G06F 1/325 (2013.01); G06F 1/3287 (2013.01); G06F 1/3296 (2013.01); G06F 13/4081 (2013.01); G06F 13/4282 (2013.01); *G06F 2213/0042* (2013.01); *Y02B 70/30* (2013.01); *Y02D 10/00* (2018.01); *Y04S 20/20* (2013.01)

(58) Field of Classification Search
CPC ........... G06F 2213/0042; G06F 1/3296; G06F 1/3287; G06F 1/263; G06F 1/266; G06F 1/3203; G06F 13/4282; G06F 1/325; G06F 13/4081; H02J 9/005; Y02B 70/30; Y04S 20/20; Y02D 10/00
USPC .................. 713/300, 310; 710/305, 313, 110
See application file for complete search history.

(56) References Cited

U.S. PATENT DOCUMENTS

| | | | |
|---|---|---|---|
| 10,224,727 B2 | 3/2019 | Li et al. | |
| 2006/0020736 A1* | 1/2006 | Jackson | G06F 13/4045 710/313 |

(Continued)

*Primary Examiner* — Arnold M Kinkead
(74) *Attorney, Agent, or Firm* — Alan D. Kamrath; Karin L. Williams; Mayer & Williams PC

(57) ABSTRACT

An energy-saving hub is connected to an electronic device, an AC power source and a mobile device. The energy-saving hug includes a power supply interface, a power module, an upstream connector, a downstream connector, a main control circuit, and a system circuit. The power supply interface is used to connect to the AC power source, the power module is connected to the power supply interface, the upstream connector and the downstream are connected to the power module, and the main control circuit is connected to the power module and the upstream connector. The system circuit is connected to the upstream connector, the downstream connector and the main control circuit, wherein the system circuit is maintained in a sleep mode. When the energy-saving hub connects to the electronic device or the mobile device, the main control circuit transmits a wake-up signal to the system circuit to wake up the system circuit.

8 Claims, 3 Drawing Sheets

(56) References Cited

U.S. PATENT DOCUMENTS

| | | |
|---|---|---|
| 2013/0234668 A1 | 9/2013 | Kuo et al. |
| 2014/0101345 A1 | 4/2014 | Ranta |
| 2016/0064786 A1 | 2/2016 | Chenault et al. |
| 2019/0036365 A1* | 1/2019 | Regupathy .......... H02J 7/00047 |

* cited by examiner

ENERGY-SAVING HUB

FIELD OF THE DISCLOSURE

The present disclosure relates to an energy-saving hub, and more particularly to an energy-saving hub having low power loss in standby mode.

BACKGROUND OF THE INVENTION

Today, in the energy regulations of related AC power products, such as: the European Union's Energy-Related Products (ErP) Directive and the US Department of Energy (DOE), power supplies with multiple outputs must achieve energy loss of 0.3 W or less under no-load conditions. However, in order to maintain basic functional operations of a hub that combines digital electronic product with an AC power source, its static power loss usually cannot meet the above-mentioned energy regulations, so conventional hubs cannot be sold in the areas where the energy regulations belong. Therefore, in order to achieve a standby state with lower power loss, conventional hubs can reduce power consumption by allowing circuit components of the hub to enter a sleep mode. However, once the circuit components enter the sleep mode, it is not easy to return to the wake-up mode, resulting in the conventional hub being unable to immediately be in a normal working state.

Hence, how to wake up the circuit components from the sleep mode and how to make the hub immediately be in the normal working state, is worthy of consideration for those skilled in this field.

SUMMARY OF THE INVENTION

In order to solve the above problems, it is an object of the present invention to provide an energy-saving hub in which circuit elements of the energy-saving hub can be quickly switched between a sleep model and a wake-up mode, such that the energy-saving hub can be immediately in a normal working state.

According to an exemplary embodiment, an energy-saving hub is provided. The energy-saving hub is adapted to be electronically connected to an electronic device, an AC power source and a mobile device located outside the energy-saving hub. The energy-saving hub includes a power supply interface, a power module, an upstream connector, a downstream connector, a main control circuit and a system circuit. The power supply interface is used to connect to the AC power source, the power module is connected to the power supply interface, the upstream connector is connected to the power module, the downstream connector is connected to the power module, and the main control circuit is electronically connected to power module and the upstream connector. The system circuit is electronically connected to the upstream connector, the downstream connector and the main control circuit, and the system circuit is maintained in a sleep mode. When the upstream connector connects to the electronic device, the main control circuit transmits a wake-up signal to the system circuit; and when the system circuit receives the wake-up signal, the system circuit is switched from the sleep mode to a wake-up mode.

In some embodiments, the upstream connector is a USB Type-C connector, and the downstream connector is a USB Type A connector.

In some embodiments, when the upstream connector connects to the electronic device, the upstream connector transmits a CC connection signal to the main control circuit.

According to another exemplary embodiment, an energy-saving hub is provided. The energy-saving hub is adapted to be electronically connected to an electronic device, an AC power source and a mobile device located outside the energy-saving hub. The energy-saving hub includes a power supply interface, a power module, an upstream connector, a downstream connector, a main control circuit, a system circuit, an upstream detector, and downstream detector. The power supply interface is used to connect to the AC power source, the power module is connected to the power supply interface, the upstream connector is used to connect to the electronic device, the downstream connector is used to connect to the mobile device, and the main control circuit is electronically connected to power module. The system circuit is electronically connected to the upstream connector, the downstream connector and the main control circuit, and the system circuit is maintained in a sleep mode. The upstream detector is electronically connected to the upstream connector, the power module and the main control circuit. The downstream detector is electronically connected to the downstream connector, the power module and the main control circuit. The main control circuit does not enter the sleep mode. When the upstream connector connects to the electronic device, the upstream detector transmits an upstream device connection signal to the main control circuit; when the main control circuit receives the upstream device connection signal, the main control circuit transmits a wake-up signal to the system circuit; and when the system circuit receives the wake-up signal, the system circuit is switched from the sleep mode to a wake-up mode.

In some embodiments, when the downstream connectors connects to the mobile device, the downstream detector transmits a downstream device connection signal to the main control circuit; and when the main control circuit receives the downstream device connection signal, the main control circuit transmits the wake-up signal to the system circuit.

In some embodiments, the upstream connector is a USB Type-C connector, and the downstream connector is a USB Type A connector or a USB Type-C connector.

In some embodiments, when the USB Type-A connector connects to the mobile device and the downstream detector detects a variation in the voltage or output current of the downstream connector, the downstream detector transmits a downstream device connection signal to the main control circuit.

In some embodiments, when the USB Type-C connector connects to the mobile device or the electronic device, the upstream connectors transmits a CC signal to the main control circuit.

In some embodiments, the power module supplies power to the main control circuit and the system circuit in an intermittent power supply mode before the system circuit is switched from the sleep mode to the wake-up mode.

In some embodiments, when the power supplied by the power module exceeds a setting value, the power module stops the intermittent power supply mode.

In some embodiments, when the setting value is a current value, the setting value is 10 mA~100 mA.

In some embodiments, the downstream detector detects a voltage variation in the outside housing of the downstream connector, wherein the voltage is decreased from 3.3V to 0V or from 5V to 0V.

In some embodiments, the main control circuit includes an intermittent wake-up mode for intermittently transmitting the wake-up signal to the system circuit; and when the upstream connector connects to the electronic device or the downstream connector connects to the mobile device, the main control circuit stops the intermittent wake-up mode.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

Figure 1:
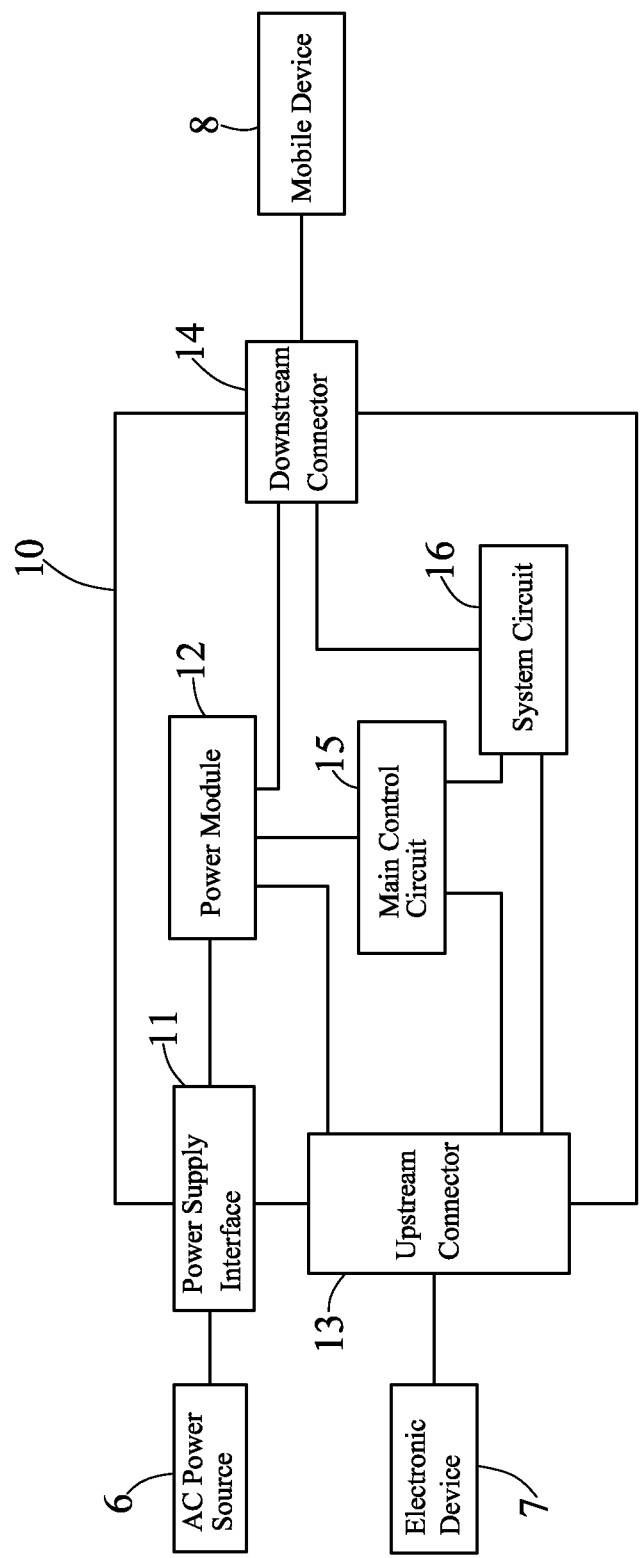
FIG. 1 is a schematic diagram showing an energy-saving hub 10 connected to an electronic device 7, an AC power source 6 and a mobile device 8 according to a first embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Please refer to FIG. 1. FIG. 1 is a schematic diagram showing an energy-saving hub 10 connected to an electronic device 7, an AC power source 6 and a mobile device 8 according to a first embodiment of the present invention. The energy-saving hub 10 is adapted to be electronically connected to an electronic device 7, an AC power source 6 and a mobile device 8 located outside the energy-saving hub 10. The electronic device 7 can be, for example, a notebook computer or a desktop computer. The mobile device 8 can be, for example, a smart phone, a tablet computer or a notebook computer.

The energy-saving hub 10 includes a power supply interface 11, a power module 12, an upstream connector 13, a downstream connector 14, a main control circuit 15 and a system circuit 16. The power supply interface 11 is used to connect to the AC power source 6. The upstream connector 13 is mainly used to connect to the electronic device 7, wherein the upstream connector 13 can be, for example, a USB Type-C connector. When the electronic device 7 is connected to the upstream connector 13, the upstream connector 13 will transmit a CC connection signal, wherein the CC connection signal is a signal transmitted from the CC pin of the USB Type-C connector. The downstream connector 14 is mainly used to connect to the mobile device 8, wherein the downstream connector 14 can be, for example, a USB Type-A connector, and thus the downstream connector 14 cannot transmit a CC connection signal. The power module 12 is electronically connected to the power supply interface 11, the upstream connector 13, the downstream connector 14 and the main control circuit 15. The AC power source 6 supplies power to the power module 12 via the power supply interface 11. The upstream connector 13 is electronically connected to the power module 12, the main control circuit 15 and the system circuit 16. The downstream connector 14 is electronically connected to the power module 12 and the system circuit 16. The main control circuit 15 is electronically connected to the system circuit 16. The system circuit 16 can be, for example, a digital signal conversion circuit, a hub circuit or a bridge circuit. When the energy-saving hub 10 is connected to the AC power source 6 and is not connected to any external device (such as, the electronic device 7 and the mobile device 8), the system circuit 16 of this embodiment continues to be maintained in a sleep mode. The sleep mode with low power consumption (also referred to as standby mode) is to turn off the processing capability of the system circuit 16, using only a small amount of energy to maintain the most basic operating state, and to support wake-up operations. The system circuit 16 can be waked up in real time. Therefore, the energy-saving hub 10 can achieve energy loss of 0.3 W or less under no-load conditions, which can comply with requirements of the European Union's Energy-Related Products (ErP) Directive and the US Department of Energy (DOE) for AC power products.

Please keep referring to FIG. 1. When the electronic device 7 is connected to the upstream connector 13, the upstream connector 13 immediately transmits the CC connection signal to the main control circuit 15. After that, when the main control circuit 15 receives the CC connection signal, the main control circuit 15 immediately transmits a wake-up signal to the system circuit 16. After that, when the system circuit 16 receives the wake up signal, the system circuit 16 is switched from the original sleep mode to a wake-up mode. Therefore, the energy-saving hub 10 can immediately be in a normal working state, and can perform data conversion, transmission or power transmission with the electronic device 7.

Compared to the conventional hub, the energy-saving hub 10 of the first embodiment can quickly be switched between the sleep mode and the wake-up mode, and the energy-saving hub 10 can immediately be in a normal working state. In the above-mentioned energy-saving hub 10, the main control circuit 15 and the system circuit 16 are divided into two different areas. However, those skilled in the art will recognize that the main control circuit 15 and the system circuit 16 can be fabricated as a single-chip microcontroller (MCU).

Figure 2:
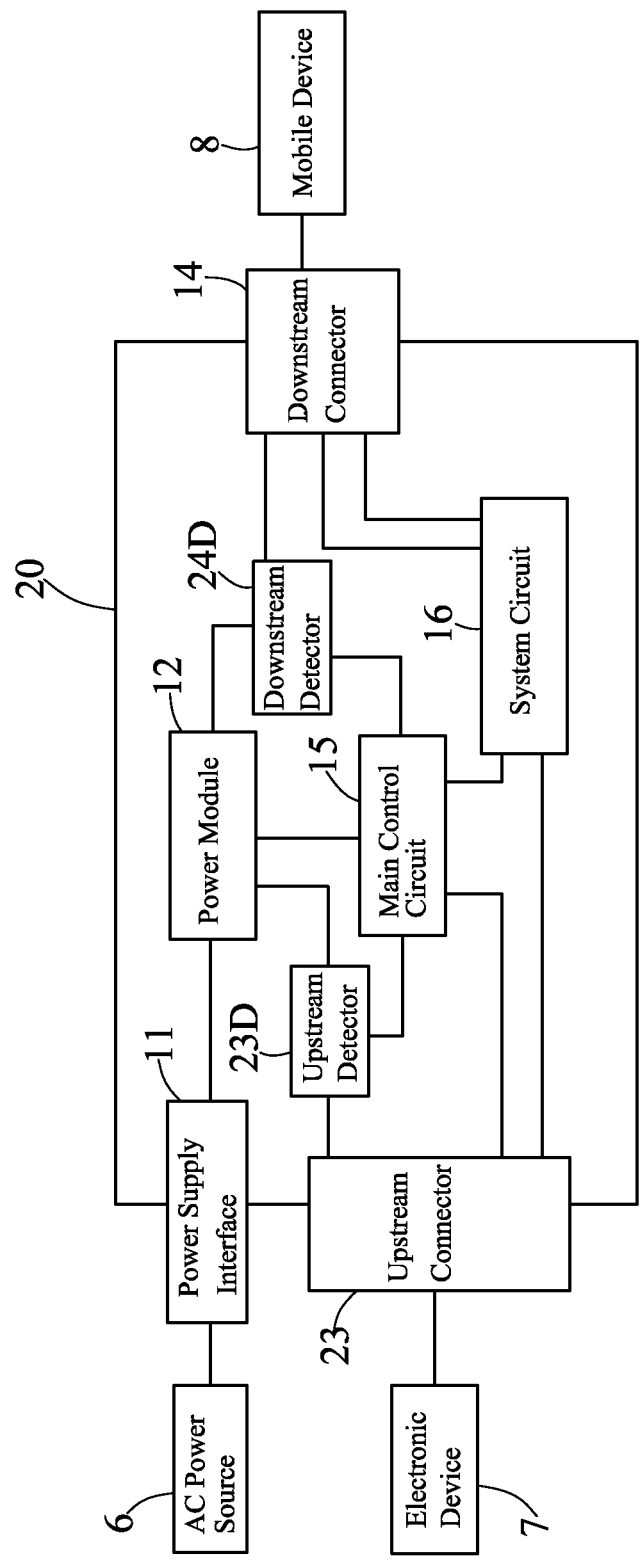
FIG. 2 is a schematic diagram showing an energy-saving hub 20 connected to external devices according to a second embodiment of the present invention.

Please refer to FIG. 2. FIG. 2 is a schematic diagram showing an energy-saving hub 20 connected to external devices according to a second embodiment of the present invention. The difference between the energy-saving hub 20 and the energy-saving hub 10 is that: the energy-saving hub 20 further includes an upstream detector 23D and a downstream detector 24D, and the upstream connector 23 of the energy-saving hub 20 is mainly a USB Type-C connector. The upstream detector 23D is electronically connected to the upstream connector 23, the power module 12 and the main control circuit 15, and the downstream detector 24D is electronically connected to the downstream connector 14, the power module 12 and the main control circuit 15. The upstream detector 23D and the downstream detector 24D are both detecting circuits, wherein the upstream detector 23D is used to detect the voltage or current of the upstream connector 23 and the downstream detector is used to detect the voltage or current of the downstream connector 14 to determine whether an external device (for example, the electronic device 7 and the mobile device 8) is connected to the energy-saving hub 20. The system circuit 16 of the energy-saving hub 20 is also maintained in a sleep mode, so that the energy-saving hub 20 can achieve energy loss of 0.3 W or less under no-load conditions, which can comply with provisions of the European Union's Energy-Related Products (ErP) Directive and the US Department of Energy (DOE) for AC power products.

Please keep referring to FIG. 2. When the electronic device 7 is connected to the upstream connector 23, the upstream detector 23D detects that the upstream connector 23 has been inserted by the electronic device 7, and the upstream detector 23D immediately transmits an upstream device connection signal to the main control circuit 15. Thereafter, when the main control circuit 15 receives the upstream device connection signal, the main control circuit 15 immediately transmits the wake-up signal to the system circuit 16. Thereafter, when the system circuit 16 receives the wake-up signal, the system circuit 16 is switched from the original sleep mode to the wake-up mode, so the energy-saving hub 20 can immediately in a normal working state.

Furthermore, when the mobile device 8 is connected to the downstream connector 14, the downstream detector 24D detects that the downstream connector 24 has been inserted by the mobile device 8 by detecting a voltage change of the connector housing (for example, from a high potential to a low potential) or a change in the output current, and the downstream detector 24D immediately transmits a downstream device connection signal to the main control circuit 15. Thereafter, when the main control circuit 15 receives the downstream device connection signal, the main control circuit 15 immediately transmits the wake-up signal to the system circuit 16. Thereafter, when the system circuit 16 receives the wake-up signal, the system circuit 16 is switched from the original sleep mode to the wake-up mode, so the energy-saving hub 20 can immediately in a normal working state. Compared to the conventional hub, the energy-saving hub 20 of the second embodiment can also quickly be switched between the sleep mode and the wake-up mode, and the energy-saving hub 20 can immediately be in a normal working state.

In the second embodiment described above, in order to make the energy-saving hub 20 achieve a standby state with lower power loss, the power module 12 supplies power to the main control circuit 15, the system circuit 16 and the connected external device(s) (such as, the electronic device 7 or the mobile device 8) in an intermittent power supply mode before the system circuit 16 is switched to the wake-up mode. In this way, the energy-saving hub 20 can achieve lower power loss even it's not under no-load conditions. However, when the power supplied by the power module 12 exceeds a setting value, the power module 12 immediately stops the intermittent power supply mode. In detail, the intermittent power supply mode of the power module 12 is suitable for external devices with lower power demands, and is not suitable for external devices with higher power demands. Therefore, when the power supplied by the power module 12 exceeds the setting value (when the setting value is a current value, the setting value is 10 mA~100 mA), the power module 12 must continuously supply power to the main control circuit 15, the system circuit 16, and the external device(s) to make the external device(s) receive sufficient power. In the example above, the setting value is a current value. However, those skilled in the art will recognize that the setting value can also be a voltage value.

Similarly, in the second embodiment, in order to balance the power consumption and the operating efficiency of the energy-saving hub 20, the main control circuit 15 further includes an intermittent wake-up mode for intermittently transmitting the wake-up signal to the system circuit 16. The system circuit 16 is constantly waked up to perform some basic operations and judgements, so the system circuit 16 is switched back and forth between the sleep mode and the wake-up mode. However, when the upstream connector 233 is connected to the electronic device 7 or when the downstream connector 14 is connected to the mobile device 8, the main control circuit 15 also stops the intermittent wake-up mode to maintain the system circuit 16 in the wake-up mode. In this way, the energy-saving hub 20 is ensured to be in the normal working state.

Figure 3:
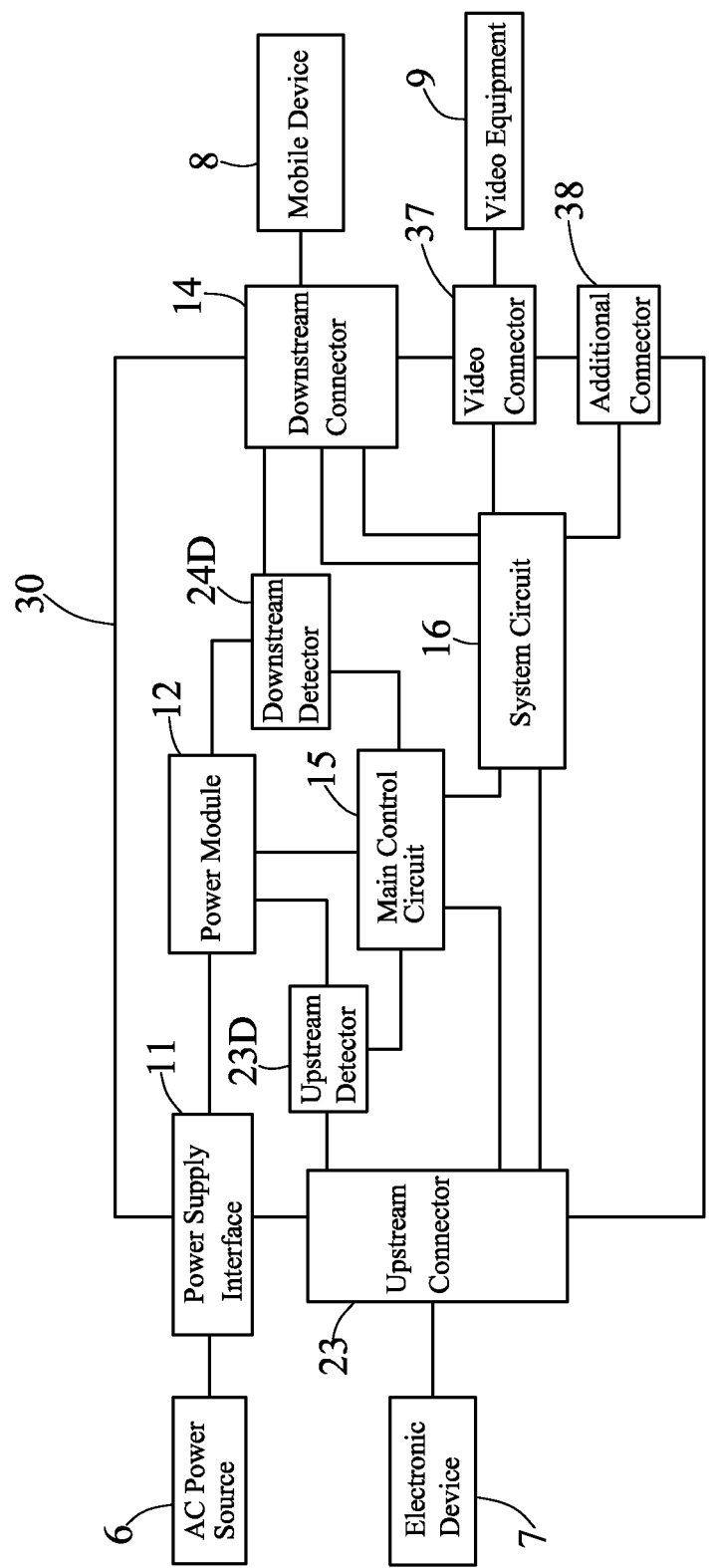
FIG. 3 is a schematic diagram showing an energy-saving hub 30 connected to external devices according to a third embodiment of the present invention.

Please refer to FIG. 3. FIG. 3 is a schematic diagram showing an energy-saving hub 30 connected to external devices according to a third embodiment of the present invention. The difference between the energy-saving hub 30 and the energy-saving hub 20 is that: the energy-saving hub 30 further includes a video connector 37 and an additional connector 38, wherein the video connector 37 can be, for example, an HDMI connector, a DVI connector or a DisplayPort connector. The video connector 37 and the additional connector 38 are electrically connected to the system circuit 16, such that the energy-saving hub 30 can be connected to the external video device 9 via the video connector 37.

According to an exemplary embodiment, an energy-saving hub is provided. The energy-saving hub is adapted to be electronically connected to an electronic device, an AC power source and a mobile device located outside the energy-saving hub. The energy-saving hub includes a power supply interface, a power module, an upstream connector, a downstream connector, a main control circuit and a system circuit. The power supply interface is used to connect to the AC power source, the power module is connected to the power supply interface, the upstream connector is connected to the power module, the downstream connector is connected to the power module, and the main control circuit is electronically connected to power module and the upstream connector. The system circuit is electronically connected to the upstream connector, the downstream connector and the main control circuit, and the system circuit is maintained in a sleep mode. When the upstream connector connects to the electronic device, the main control circuit transmits a wake-up signal to the system circuit; and when the system circuit receives the wake-up signal, the system circuit is switched from the sleep mode to a wake-up mode.

In some embodiments, the upstream connector is a USB Type-C connector, and the downstream connector is a USB Type A connector.

In some embodiments, when the upstream connector connects to the electronic device, the upstream connector transmits a CC connection signal to the main control circuit.

According to another exemplary embodiment, an energy-saving hub is provided. The energy-saving hub is adapted to be electronically connected to an electronic device, an AC power source and a mobile device located outside the energy-saving hub. The energy-saving hub includes a power supply interface, a power module, an upstream connector, a downstream connector, a main control circuit, a system circuit, an upstream detector, and downstream detector. The power supply interface is used to connect to the AC power source, the power module is connected to the power supply interface, the upstream connector is used to connect to the electronic device, the downstream connector is used to connect to the mobile device, and the main control circuit is electronically connected to power module. The system circuit is electronically connected to the upstream connector, the downstream connector and the main control circuit, and the system circuit is maintained in a sleep mode. The upstream detector is electronically connected to the upstream connector, the power module and the main control circuit. The downstream detector is electronically connected to the downstream connector, the power module and the main control circuit. The main control circuit does not enter the sleep mode. When the upstream connector connects to the electronic device, the upstream detector transmits an upstream device connection signal to the main control circuit; when the main control circuit receives the upstream device connection signal, the main control circuit transmits a wake-up signal to the system circuit; and when the system circuit receives the wake-up signal, the system circuit is switched from the sleep mode to a wake-up mode.

In some embodiments, when the downstream connectors connects to the mobile device, the downstream detector transmits a downstream device connection signal to the main control circuit; and when the main control circuit receives the downstream device connection signal, the main control circuit transmits the wake-up signal to the system circuit.

In some embodiments, the upstream connector is a USB Type-C connector, and the downstream connector is a USB Type A connector or a USB Type-C connector.

In some embodiments, when the USB Type-A connector connects to the mobile device and the downstream detector detects a variation in the voltage or output current of the downstream connector, the downstream detector transmits a downstream device connection signal to the main control circuit.

In some embodiments, when the USB Type-C connector connects to the mobile device or the electronic device, the upstream connectors transmits a CC signal to the main control circuit.

In some embodiments, the power module supplies power to the main control circuit and the system circuit in an intermittent power supply mode before the system circuit is switched from the sleep mode to the wake-up mode.

In some embodiments, when the power supplied by the power module exceeds a setting value, the power module stops the intermittent power supply mode.

In some embodiments, when the setting value is a current value, the setting value is 10 mA~100 mA.

In some embodiments, the downstream detector detects a voltage variation in the outside housing of the downstream connector, wherein the voltage is decreased from 3.3V to 0V or from 5V to 0V.

In some embodiments, the main control circuit includes an intermittent wake-up mode for intermittently transmitting the wake-up signal to the system circuit; and when the upstream connector connects to the electronic device or the downstream connector connects to the mobile device, the main control circuit stops the intermittent wake-up mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An energy-saving hub, adapted to be electronically connected to an electronic device, an AC power source and a mobile device located outside the energy-saving hub, the energy-saving hub comprising:
   a power supply interface, used to connect to the AC power source;
   a power module, connected to the power supply interface;
   an upstream connector, connected to the power module;
   a downstream connector, connected to the power module;
   a main control circuit, electronically connected to power module and the upstream connector; and
   a system circuit, electronically connected to the upstream connector, the downstream connector and the main control circuit, and the system circuit is maintained in a sleep mode;
   wherein when the upstream connector connects to the electronic device, the main control circuit transmits a wake-up signal to the system circuit; and when the system circuit receives the wake-up signal, the system circuit is switched from the sleep mode to a wake-up mode; wherein when the upstream connector connects to the electronic device, the upstream connector transmits a CC connection signal to the main control circuit.

2. The energy-saving hub in claim 1, wherein the upstream connector is a USB Type-C connector, and the downstream connector is a USB Type A connector.

3. An energy-saving hub, adapted to be electronically connected to an electronic device, an AC power source and a mobile device located outside the energy-saving hub, the energy-saving hub comprising:
   a power supply interface, used to connect to the AC power source;
   a power module, connected to the power supply interface;
   an upstream connector, used to connect to the electronic device;
   a downstream connector, used to connect to the mobile device;
   a main control circuit, electronically connected to power module;
   a system circuit, electronically connected to the upstream connector, the downstream connector and the main control circuit, and the system circuit is maintained in a sleep mode;
   an upstream detector, electronically connected to the upstream connector, the power module and the main control circuit; and
   a downstream detector, electronically connected to the downstream connector, the power module and the main control circuit;

wherein when the upstream connector connects to the electronic device, the upstream detector transmits an upstream device connection signal to the main control circuit; when the main control circuit receives the upstream device connection signal, the main control circuit transmits a wake-up signal to the system circuit; and when the system circuit receives the wake-up signal, the system circuit is switched from the sleep mode to a wake-up mode: wherein the power module supplies power to the main control circuit and the system circuit in an intermittent power supply mode before the system circuit is switched from the sleep mode to the wake-up mode.

4. The energy-saving hub in claim 3, wherein when the downstream connectors connects to the mobile device, the downstream detector transmits a downstream device connection signal to the main control circuit; and when the main control circuit receives the downstream device connection signal, the main control circuit transmits the wake-up signal to the system circuit.

5. The energy-saving hub in claim 4, wherein the downstream connector is a USB Type A connector.

6. The energy-saving hub in claim 3, when the power supplied by the power module exceeds a setting value, the power module stops the intermittent power supply mode.

7. The energy-saving hub in claim 6, wherein when the setting value is a current value, the setting value is 10 mA~100 mA.

8. The energy-saving hub in claim 3, wherein the main control circuit comprises an intermittent wake-up mode for intermittently transmitting the wake-up signal to the system circuit; and when the upstream connector connects to the electronic device or the downstream connector connects to the mobile device, the main control circuit stops the intermittent wake-up mode.

* * * * *